United States Patent [19]

Firestone

[11] 4,267,150

[45] May 12, 1981

[54] SPLASH GUARD DEVICE

[76] Inventor: Raymond A. Firestone, 60 Hunter Ave., Fanwood, N.J. 07023

[21] Appl. No.: 70,967

[22] Filed: Aug. 30, 1979

[51] Int. Cl.³ .............................................. B64C 27/42
[52] U.S. Cl. .............................. 422/103; 203/DIG. 2
[58] Field of Search ................. 141/286, 311 A, 369, 141/370, 372, 374, 375, 376, 390, 391, 392; 202/194, 195; 203/DIG. 2; 422/99–103

[56] References Cited

U.S. PATENT DOCUMENTS 324,494   8/1885   Shay ..................................... 141/372

Primary Examiner—Frank Sever
Attorney, Agent, or Firm—Mario A. Monaco

[57] ABSTRACT

A splash guard device for passing a gas or vaporized liquid out of a vessel while preventing any of the liquid from leaving said vessel.

9 Claims, 3 Drawing Figures

U.S. Patent May 12, 1981 4,267,150
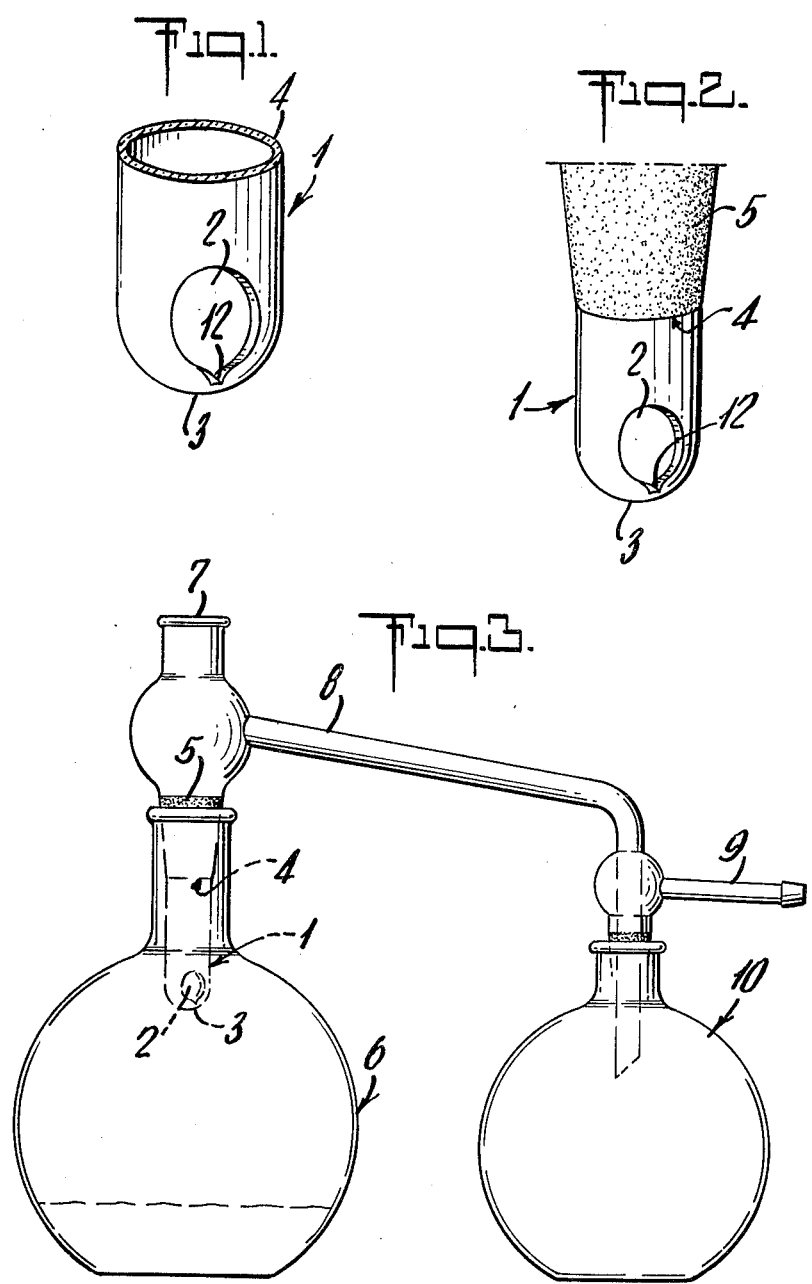

SPLASH GUARD DEVICE

SUMMARY OF THE INVENTION

This invention relates to a splash guard device which is useful in situations where it is desired to pass a gas or vaporized liquid out of a vessel while separating it from a liquid which is to be left behind. More particularly, it relates to a hollow tube, open at one end only and having one or more voids on the side of the tube at or near the closed end.

In distillation procedures and particularly vacuum distillations, liquid bumping and splashing is a common occurrence. This splashing results in the carry over of liquid droplets with the high velocity stream of vapor into the distillate resulting in contamination of the distillate and the necessity to dismantle the distilling apparatus in order to clean it and recover the splashed residue. To overcome this problem of bumping and splashing, distillation apparatus have been used in conjunction with a Claisen head, a Vigreaux column and less desirably a long tube between the distillation vessel and the condenser. This latter approach as well as the other, however, require a higher pot temperature to carry the vapor over into the condenser. This leads to greater decomposition of compounds in the vessel. While the Claisen heads and Vigreaux columns have helped to reduce the splash over problem, the length of these columns still necessitates a sufficiently large temperature increment between the pot and condensers and therefore continues to cause unwanted decomposition of compounds in the pot.

My splash guard device substantially eliminates any splashing from the pot to the condenser, while at the same time, because of its design, the distance between the pot and condenser has been reduced to an absolute minimum and the need for a temperature increment between the pot and condenser has been essentially eliminated.

Therefore, it is an object of my invention to provide a novel splash guard device which prevents splashing of liquids out of a distilling vessel or pot when distillation is taking place.

It is a further object of my invention to decrease the path from the pot to the condenser and thereby require less heat to drive the vapor through the distilling apparatus, resulting in less decomposition of material that would otherwise occur.

Other objectives will become apparent to those skilled in the art.

The present invention and its advantages thereof may be more fully understood by considering the accompanying drawings wherein FIG. 1 represents a side view of my device;

FIG. 2 represents a side view of a preferred embodiment of my device having a joint to seal the device to a vessel; and FIG. 3 represents a side view of another embodiment of my device comprising in combination my device and a typical distilling apparatus having my device attached thereto.

Referring now to FIGS. 1, 2 and 3, my splash guard device 1 comprises a tube of any desired length open at one end 4 and sealed at the other end 3. The splash guard device 1 contains at least one void 2 on the side of said tube adjacent and substantially at the sealed end of the tube. Although two or more voids are within the contemplation of the invention, only one void is preferred. Hereinafter when the term "void" is used, it is meant one or more.

Although the tube is preferably of glass and of cylindrical shape any other material and shape can be utilized. For example, various plastic and metal tubes of cubic, conical, rectangular and other shapes may be used. The void may similarly be of any shape such as circular, round, square, rectangular or oval; however, it is preferred to be round. It is also preferred that the void be only slightly smaller than the length and width of the tube although the void could be much smaller. Preferably the void has a width of approximately the same size as the width of the tube, for example, in the case of a cylinder, the width would be the diameter of the tube. Similarly, therefore, in the preferred embodiment the void would be round or circular having a diameter of approximately the same size as that of the cylinder. The void is located adjacent the sealed end of the tube and the bottom end of the void can be as close to the sealed end of the tube as desired. All that is necessary is that the bottom end of the void not be part of the bottom end of the tube and no part of the void should face the bottom of the vessel. If desired the void may have a drip tip 12 at its bottom end to guide the liquid drops that reach that point back into the vessel.

In another variation of my device, the void need not be flush with the tube but could be protruding therefrom such as in the form of a periscope. In still a further variation of my device, the void may be the upper end of a U-shaped tube with one end of the tube leading outside the vessel and the other end being the void to within the vessel.

FIG. 2 is still another embodiment of my device. In this embodiment the tube as shown in FIG. 1 has joined thereto, at 4, a joining means 5 to seal the tube to a vessel. Any means for joining may be used such as an O-ring sealed joint, ground joint (such as ground glass joint, male or female), cork or rubber stoppers, bayonet joint or screw fastener but preferably a ground joint 5 and especially a ground glass joint. This joining means can be any size or shape consistent with the size of the tube, the vessel into which the tube is placed and whatever other device is connected to the outer end of the joining means.

As another variation of this invention, the joining means referred to may have connected thereto a second joining means which second joining means can be connected directly to the first joining means or can be separated from the first joining means by a body member such as a hollow connector. This second joining means may be the same as or different from the first joining means.

As a still further embodiment of my invention, an apparatus for conveying the gas or gas vapor going through the tube may be attached to the joining means. The apparatus may be merely an extended tubular piece, or other means for conveying the gas; or preferably a condensing apparatus, air cooled, liquid cooled or otherwise. An example of this preferred embodiment is shown in FIG. 3. My preferred embodiment is shown, for descriptive purposes, with a vessel 6 containing a liquid for distillation and a receiving vessel 10. A description of the operation of my invention when used in distillation follows with reference to the embodiment shown in FIG. 3.

In distillation procedures, particularly vacuum distillation, bumping and splashing as previously indicated occurs and causes some of the liquid to splash out of the vessel 6. With my device 1, the splashing liquid is prevented from leaving the vessel as the only opening is through the void 2 on the side of the tube 1. The gas, however, can readily escape from the vessel as its path of movement is not dependent upon the position of the opening from the vessel to the outside. Thus, while the liquid is retained in the vessel 6, the gas flows through the opening 2. This embodiment of my device, see FIG. 3, comprises a tube 1 having a void 2 on its side, a joining means 5 for attaching said tube 1 to said vessel 6, a conduit 8 attached to said means 5 for movement of the gas leaving the vessel 6. The conduit is preferably a glass tube extending from means 5 or from a converting member at an oblique angle and opened at least at one end. In its most preferred aspect, this embodiment comprises a distilling apparatus attached to tube 1.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto.

What is claimed is:

1. A splash guard device which comprises a tube having one imperforated end and one open end; at least one void on the side of the tube adjacent the imperforated end and a joining means attached to the open end of said tube; said joining means having an outer surface means for sealing said splash guard device to a reboiling means for a distillation operation and an inner surface means for sealing said splash guard device to a condensing means for a distillation operation.

2. The device of claim 1 having a drip tip at the bottom poriton of said void(s).

3. The device of claim 1 wherein the void(s) has a width approximately equal to that of the tube.

4. The device of claim 1 wherein the tube is cylindrical and the void is round.

5. The device of claim 4 wherein the void is approximately the diameter of the cylinder.

6. The device of claim 1 wherein the joining means is a ground glass joint.

7. The device of claim 1 having an additional joining means attached directly to or separated by a connector to the first joining means.

8. The device of claim 7 wherein the tube is cylindrical and the void is round and of approximately the same diameter as that of the cylinder.

9. The device of claim 1 wherein the tube is cylindrical and the void is round and of approximately the same diameter as that of the cylinder.

* * * * *